United States Patent
Julicher et al.

(10) Patent No.: US 9,450,419 B2
(45) Date of Patent: Sep. 20, 2016

(54) COMBINED POWER SUPPLY AND INPUT/OUTPUT SYSTEM WITH BOOST CAPABILITY

(71) Applicant: Microchip Technology Incorporated, Chandler, AZ (US)

(72) Inventors: Joseph Julicher, Maricopa, AZ (US); Pieter Schieke, Phoenix, AZ (US); Vivien Delport, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 638 days.

(21) Appl. No.: 13/841,829

(22) Filed: Mar. 15, 2013

(65) Prior Publication Data
US 2014/0265627 A1 Sep. 18, 2014

(51) Int. Cl.
*H02J 4/00* (2006.01)
*G06F 13/10* (2006.01)
*H02J 7/00* (2006.01)
*G06F 13/42* (2006.01)
*G06F 13/40* (2006.01)
*H04B 3/54* (2006.01)
*H04L 12/10* (2006.01)

(52) U.S. Cl.
CPC ............ *H02J 4/00* (2013.01); *G06F 13/4072* (2013.01); *G06F 13/4291* (2013.01); *H02J 7/00* (2013.01); *H04B 3/542* (2013.01); *H04B 3/548* (2013.01); *H04L 12/10* (2013.01); *Y10T 307/74* (2015.04)

(58) Field of Classification Search
CPC ... H04B 3/542; H04B 3/548; G06F 13/4291; G06F 13/10; H02J 13/002–13/0048; Y04S 40/121–40/123

USPC .......................................... 307/109, 112, 1–8
See application file for complete search history.

(56) References Cited

U.S. PATENT DOCUMENTS

| | | | | | |
|---|---|---|---|---|---|
| 4,556,865 | A | * | 12/1985 | Fukagawa | H04B 3/542 340/12.34 |
| 5,614,811 | A | * | 3/1997 | Sagalovich | H02J 13/0034 307/140 |
| 5,818,127 | A | * | 10/1998 | Abraham | H04L 27/0014 307/106 |
| 7,911,088 | B2 | * | 3/2011 | Mutabdzija | H01M 10/48 307/150 |
| 8,736,238 | B2 | * | 5/2014 | Li et al. | 323/229 |
| 2007/0007818 | A1 | * | 1/2007 | O'Gorman | H02J 7/245 307/1 |
| 2008/0298385 | A1 | | 12/2008 | Ng et al. | 370/445 |
| 2012/0250811 | A1 | * | 10/2012 | Misek et al. | 375/371 |
| 2013/0241519 | A1 | * | 9/2013 | Li et al. | 323/311 |

FOREIGN PATENT DOCUMENTS

| EP | 0360543 A1 | 3/1990 | H02J 13/00 |
|---|---|---|---|
| EP | 2551183 A1 | 1/2013 | B60R 16/023 |

OTHER PUBLICATIONS

International Search Report and Written Opinion, Application No. PCT/US2014/019627, 9 pages, Apr. 29, 2014.

* cited by examiner

*Primary Examiner* — Rexford Barnie
*Assistant Examiner* — Terrence Willoughby
(74) *Attorney, Agent, or Firm* — Slayden Grubert Beard PLLC (57) ABSTRACT

A combined power and input/output system for an electronic device includes a host system; a target system operably coupled to the host system via a combined power and I/O line; and a power boost circuit in the target system for enabling a higher voltage target device.

19 Claims, 7 Drawing Sheets

COMBINED POWER SUPPLY AND INPUT/OUTPUT SYSTEM WITH BOOST CAPABILITY

TECHNICAL FIELD

The present disclosure relates to power and communications connections for electronic devices. In particular the present disclosure relates to a source voltage boost with combined power and input/output lines.

BACKGROUND

In the field of mobile devices, such as cellular telephone and Blackberrys, a small form factor is an increasingly important design consideration. Such devices typically include battery packs having power lines and input/output lines. In some instances, however, the small form factor of battery packs makes it difficult to provide sufficient pins for communicating.

Accordingly, it is known to provide a combined power and input/output pin or pins on an integrated circuit or other device. Such solutions typically include a diode and capacitor or a resistor and capacitor to extract power and store it for the device.

The diode-capacitor solution, however, has proven to be disadvantageous in low voltage systems. More particularly, in such systems, the diode drop may be insurmountable.

The resistor-capacitor solution is disadvantageous owing to baud rate and power consumption contention. That is, low power consumption requires large resistors which require longer on-times and lower baud rates which increase power consumption.

Furthermore, in very low voltage combined power and communications applications, there may not be sufficient Vdd to allow other operations, such as self-writing the flash memory.

As such, there is a need for an improved combined low power and input/output solution that allows for additional operations.

SUMMARY

A combined power and input/output system for an electronic device includes a host system; a target system operably coupled to the host system via a combined power and I/O line; and a power boost circuit in the target system for enabling a higher voltage target device.

A method for providing power and I/O on a single line includes driving a combined I/O power line to charge a power supply capacitor in a first mode; and alternately connecting and disconnecting a power boost circuit to charge and discharge the power supply capacitor during a communication over the combined I/O power line in a second mode.

An electronic device in accordance with embodiments includes a host system; and a target system operably coupled to the host system via a combined power I/O line; wherein the target system includes a power boost circuit and a switching system cooperative to allow the host system to charge a power supply capacitor on the target system via the combined power I/O line in a first mode and alternately charge and discharge the power supply capacitor during a communication via the combined power I/O line in a second mode, wherein the alternately charging and discharging is in synchronization with said communication.

Additional objects and advantages of the present invention will become apparent to one skilled in the art upon reading and understanding exemplary embodiments described herein with reference to the following drawings.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Figure 1A:
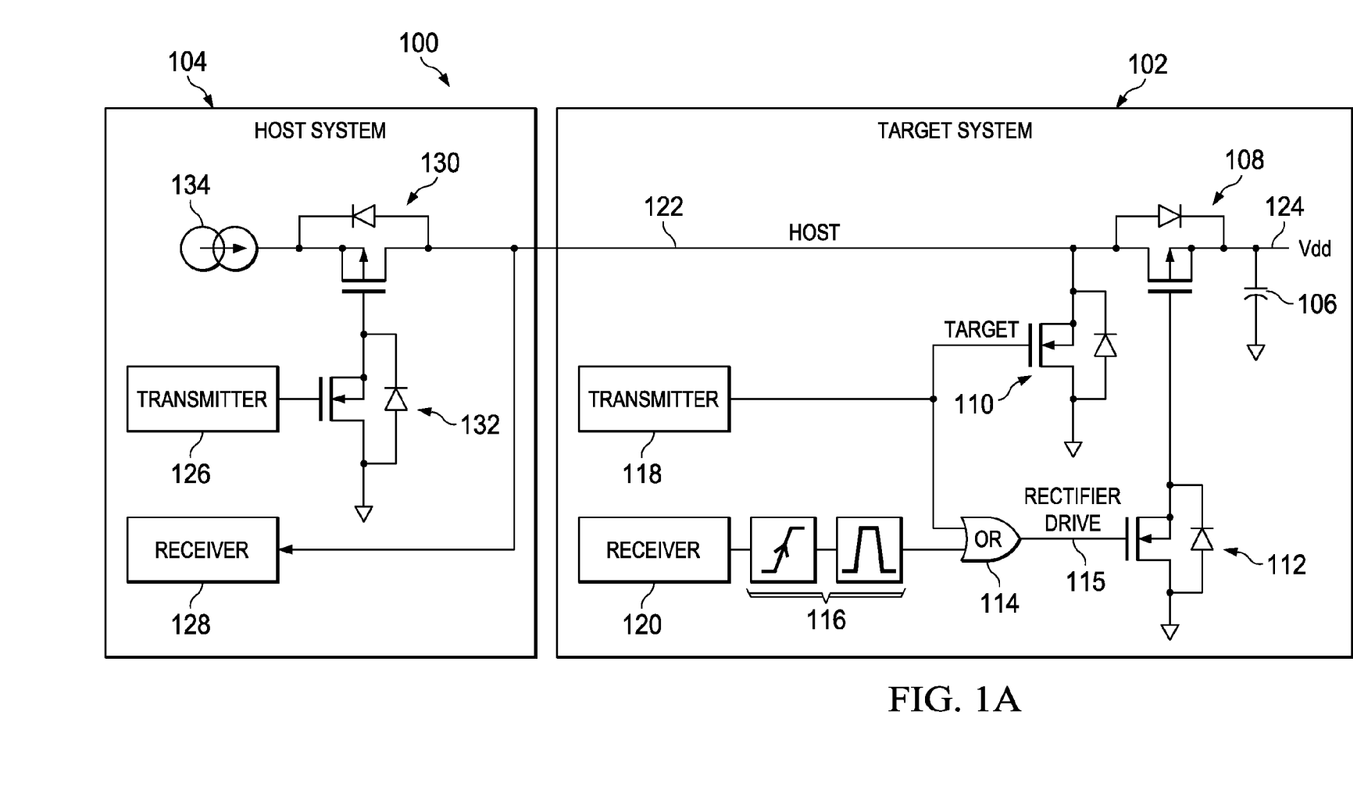
FIG. 1A and FIG. 1B are block diagrams of systems according to embodiments of the invention.
Figure 2A:
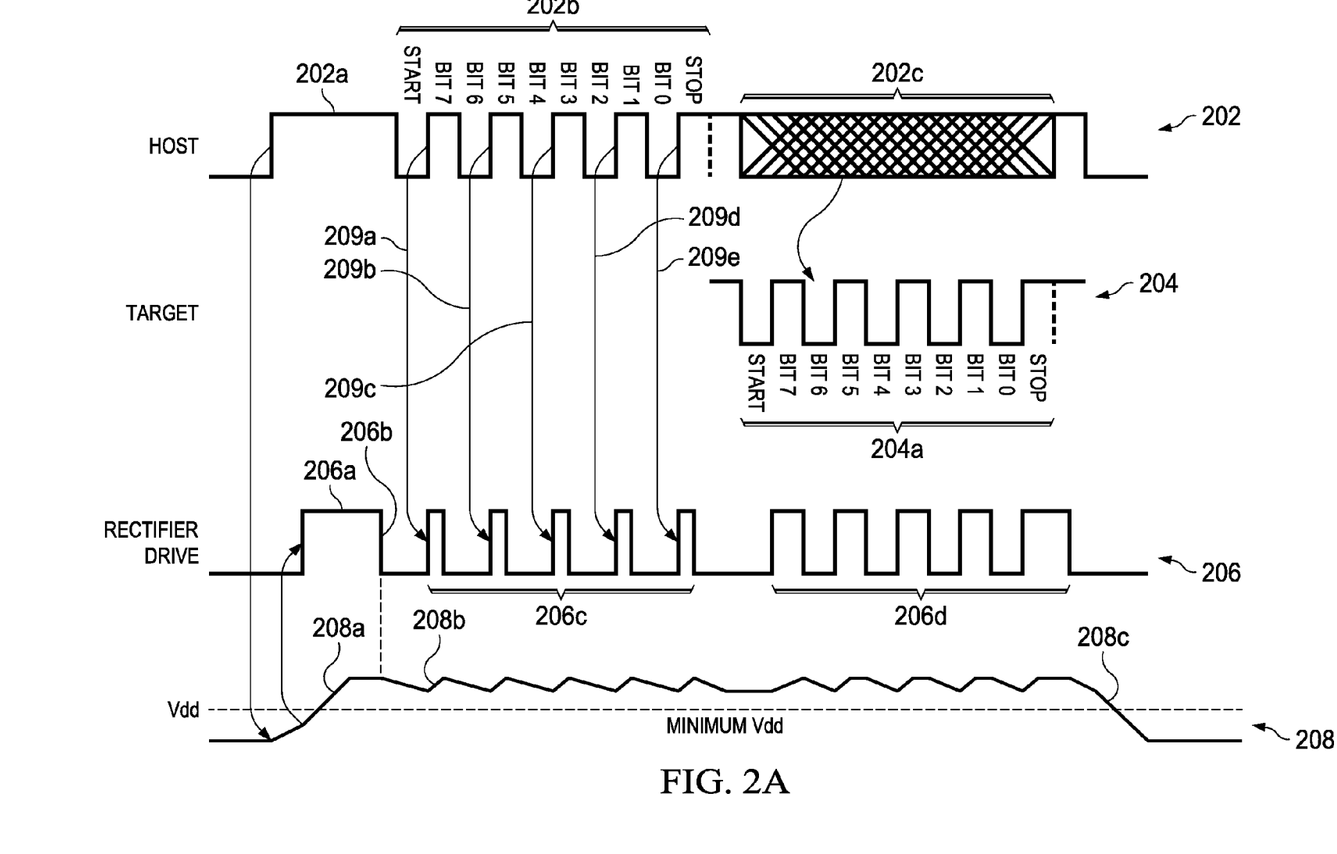
FIG. 2A and FIG. 2B are timing diagrams illustrating operation of the circuit system of FIG. 1A and FIG. 1B, respectively.

Turning now to the drawings and, with particular attention to FIG. 1A, a diagram illustrating an exemplary combination power supply input/output system 100 is shown. As will be explained in greater detail below, embodiments use a fixed on-time for an input/output pin drive, which allows rapid output transitions and minimizes the effects of bus contention. FIG. 2A illustrates an exemplary timing diagram for operation of the circuit of FIG. 1A.

In the embodiment illustrated, a host system 104 is in communication with a target system 102. The host system may include a source 134, transmitter 126, receiver 128, and switches 130, 132. The switches 130, 132 may be embodied as, for example, switching transistors. The host system 104 couples via a line 122 to the target system 102. The source 134 may be a current source or a voltage source. Thus, the figures are exemplary only. In operation, the switches 130, 132 function to switch the current from the source 134 or the transmitter 126 or receiver 128 to drive the host line 122. In operation, the switches 130, 132 function to switch current from the source 134 or the transmitter 126 or receiver 128 to drive the host line 122.

In particular, in a first or power mode, the host system 104 will drive the host line 122 high for a few milliseconds using the source 134. As seen at time 202a (FIG. 2A), this causes the voltage Vdd 208 to ramp up and gives the target system 102 enough time to be powered by the parasitic diode present in the pass transistor 108. When sufficient voltage is present on the Vdd power supply capacitor 106, the pass transistor 108 will become active and the charge rate will increase, as shown at 208a. The output of OR gate 114, rectifier drive 115, follows the host at 206a.

After some time passes, as shown at 206b, the target device 102 will disconnect the pass transistor 108, allowing the host system 104 to begin communications without discharging the target power.

The bit stream from the host 104 on line 122 is shown at 202b. During this communications mode input phase, the target system 102 will assert the pass transistor 108 for a short period after each rising edge from the host 122. That is, as shown at 209a-209e, rectifier drive 206c is high for a brief period, corresponding to the assertion of the pass transistor 108.

This provides an opportunity for the Vdd capacitor 106 to charge up a little during each data bit, as shown for example, at 208b. As can be appreciated, the maximum baud rate is dictated by the on period of the pass transistor 108.

When the host 104 is finished transmitting, it is possible for the target 102 to communicate in an output phase with the host 104 as shown at 204 by pulling the host power line 122 low during each bit, as shown at 204a. When the target is not pulling the power line 122 low, it can assert the pass transistor 108 for the entire high portion of the data bit, i.e., rectifier drive 115 via transistor 112. This synchronization is possible because the target knows the entire duration of each data bit.

In addition, as noted above, a software override of the pass transistor 108 can be provided to allow software to force power to be available for a high current activity such as writing to an EEPROM. When the host/target communications are complete, the host can disable the power connection and the target Vdd will decay at 208c until the target is powered off.

Figure 1B:
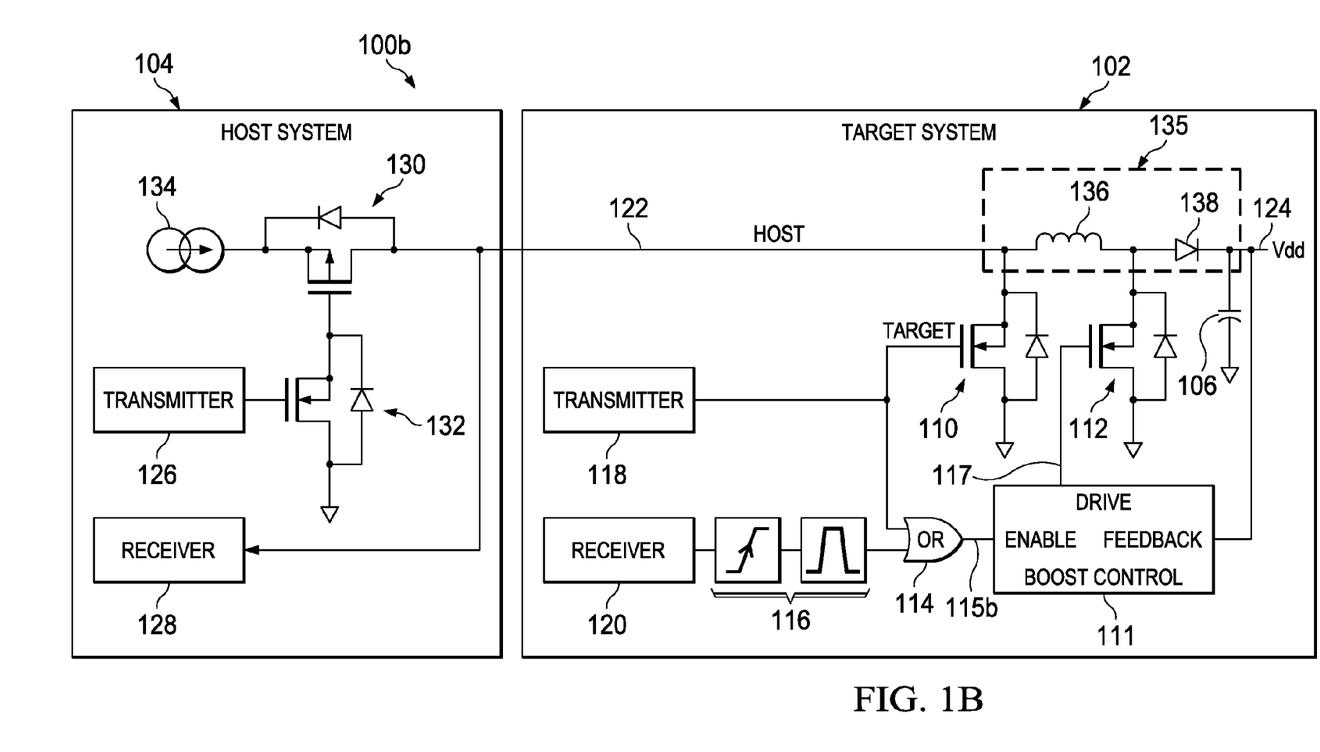
Figure 2B:
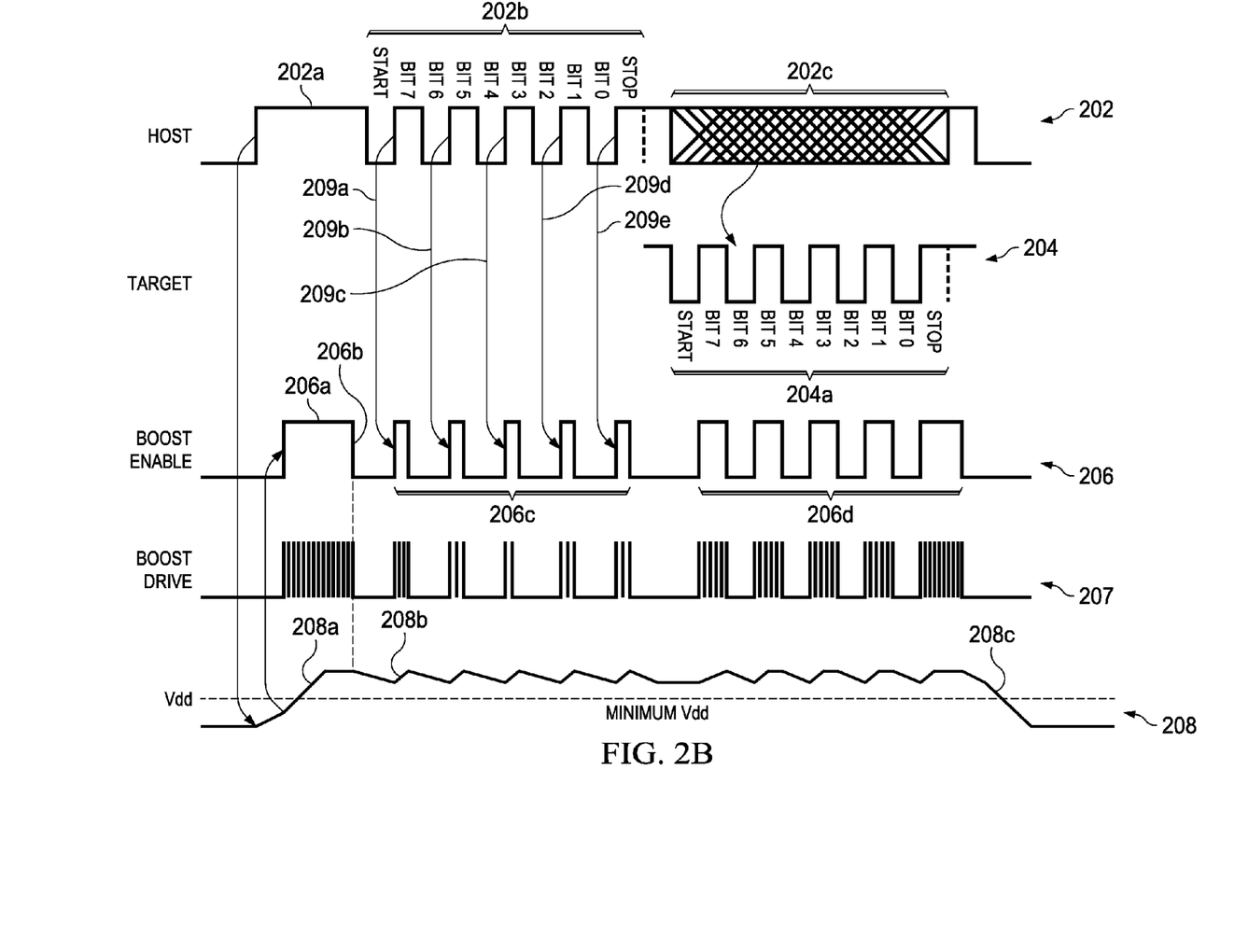
Figure 3A:
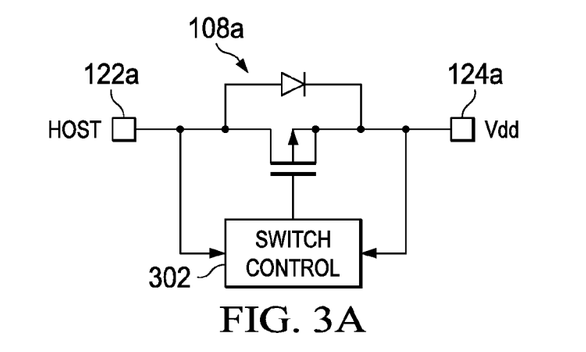
FIG. 3A-FIG. 3E illustrate exemplary switching controls according to embodiments of the invention.
Figure 3B:
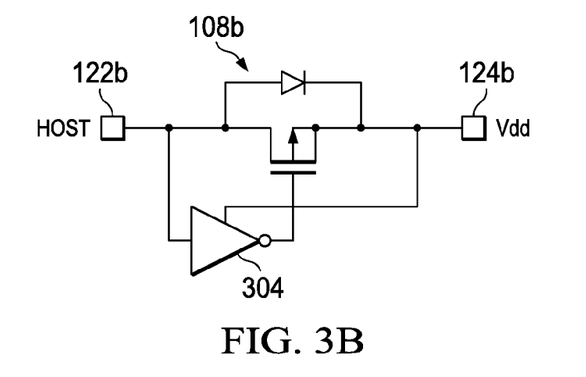
Figure 3C:
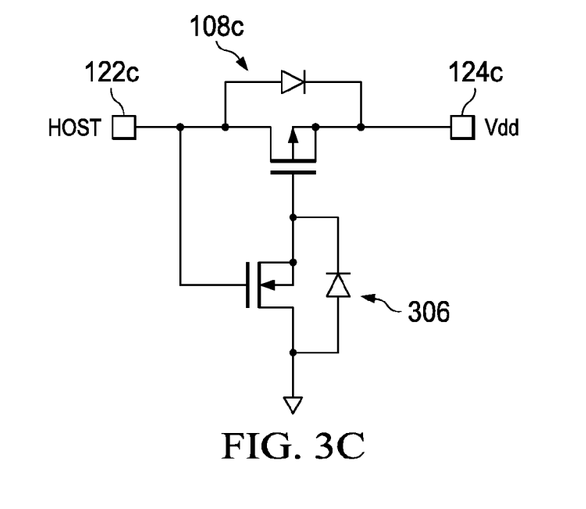
Figure 3D:
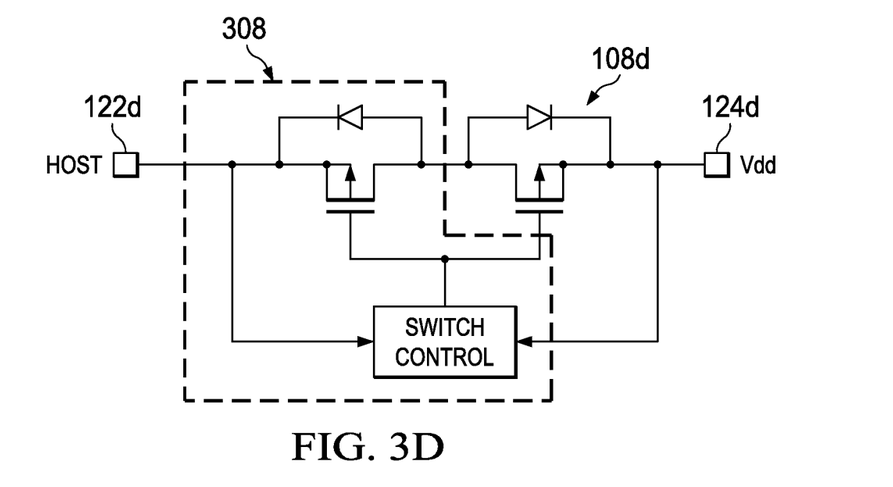
Figure 3E:
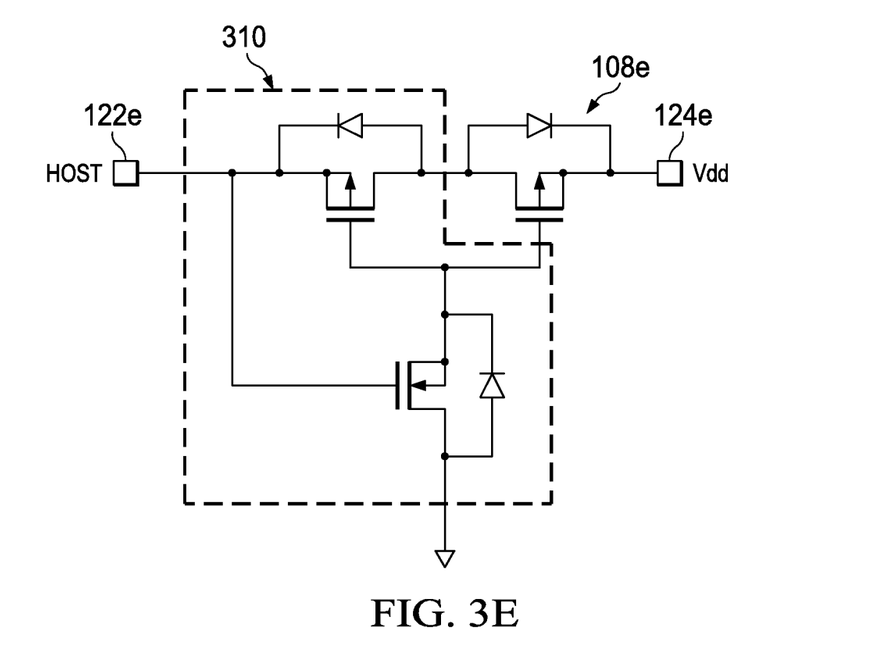

An exemplary system operating in a power boost mode with an override of the pass transistor is shown in FIG. 1B, with timing therefor shown in FIG. 2B. In particular, the system 100b is generally similar to system 100 except that it includes boost control 111 and a boost circuit 135 including inductor 136 and diode 138. In operation, the boost enable line 115b functions generally similarly to rectifier drive line 115 but provides a drive signal 117 to transistor switch 112. In operation, when the transistor switch 112 is cycled (as shown at 207 in FIG. 2B), the capacitor 106 will be charged from the inductor 136, boosting Vdd. When the transistor switch 112 is "closed" the Vdd capacitor will discharge a boosted voltage. Thus, the embodiment of FIG. 1B allows for a relatively lower input voltage from the host system that can be stepped up to a useable Vdd on the target system.

Several embodiments of a pass transistor circuit are illustrated in FIG. 3A-FIG. 3E. In each case, a host 122 provides power via a pass transistor 108 to charge voltage Vdd 124. Depending on the embodiment, it can be a switch control 302 (FIG. 3A), tristate 304 (FIG. 3B), transistor 306, or combinations thereof, 308, 310.

Figure 4:
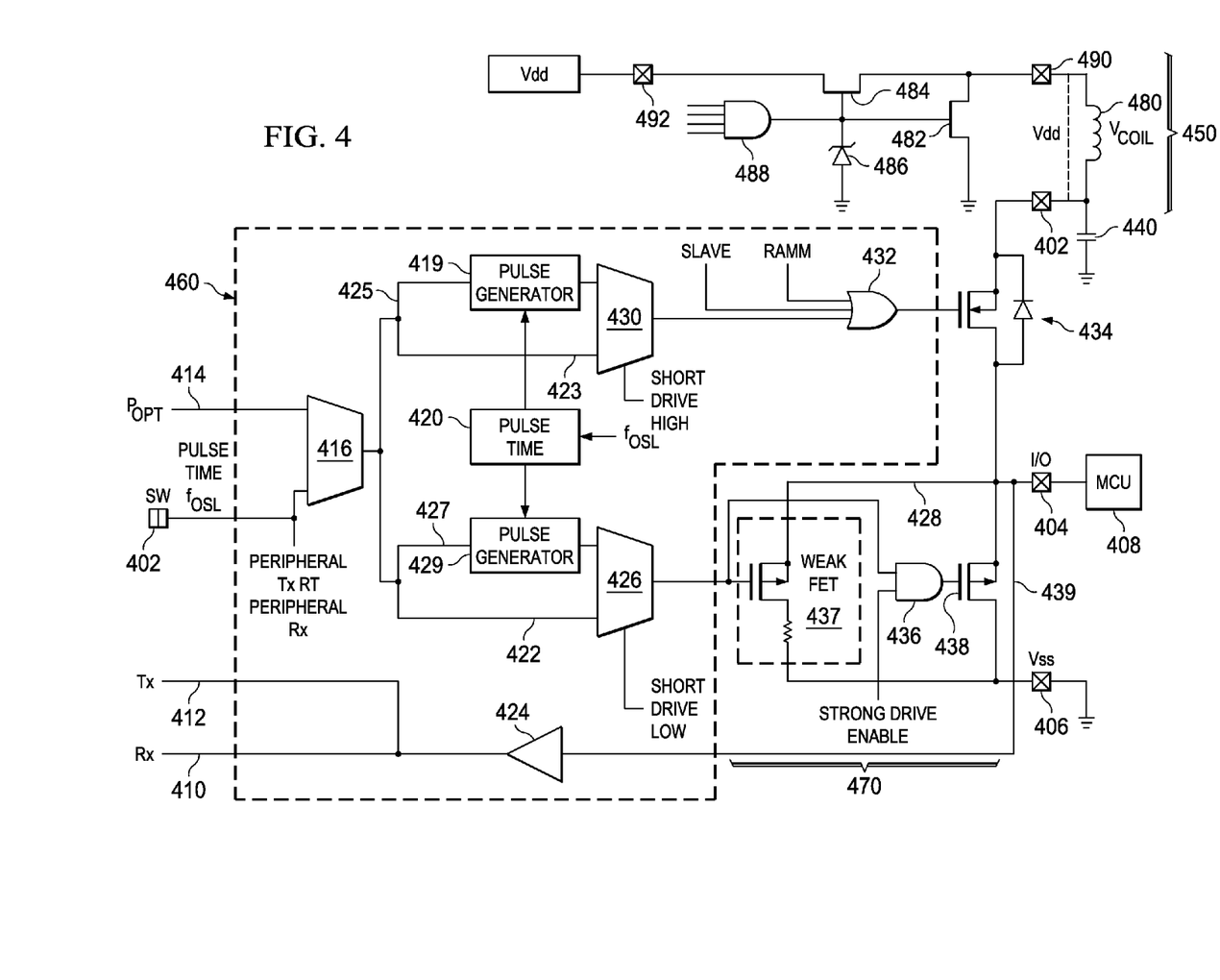
FIG. 4 is a circuit diagram illustrating an embodiment of the present invention.

A combined power supply input/output system including a boost circuit in accordance with an embodiment of the invention is illustrated in greater detail in FIG. 4. In the embodiment illustrated, a microcontroller (MCU) 408 acts as the host system and couples via an I/O port 404 to a target system 400. The target system 400 includes pass transistor 434 and switching system 470, as well an input system 460.

A power supply capacitor 440 couples to target system 400 and pass transistor 434 via port 402. I/O line 439 couples I/O port 404 to RX 412 and TX 414 I/O and to the power supply capacitor 440 via pass transistor 434. The MCU 408 provides host system I/O and a source of current (not shown) to charge the power supply capacitor in a manner similar to that discussed above.

In operation, the switching system 470 and pass transistor 434 cooperate to allow for I/O operations and power supply operations. Switching system 470 includes AND gate 436 and weak FET 437 and FET 438. One input of the AND gate 436 is provided by multiplexer 426 of the input system 460 while the other is from a "Strong Drive Enable."

The input system 460 includes OR gate 432 which can receive SLEEP and RESET inputs, as well as an input from multiplexer 430. The SLEEP and RESET inputs allow the capacitor to charge at full speed by enabling transistor 437 during these conditions. When the device wakes, active control of transistor 437 can resume.

The input system 460 includes common TX/RX lines 410/412 enabling the data received or transmitted to control the pass transistor 434. When the line power line is not low, this connection allows capacitor 440 to be recharged as quickly as possible. The input system 460 includes a multiplexer 416 that allows multiple peripherals or software to be used to control the entire system. Other possible peripherals that would be suitable include a PWM or Manchester encoders.

The output of multiplexer 416 is provided via lines 423 and 422 as inputs to multiplexer 430,426 respectively. In addition the output of 416 is provided via lines 426, 426 to one shots 419,429 respectively, as the other inputs to the multiplexers 430,426. A pulse timer 420 controls the operation of the one shots 419, 429. The inputs to the multiplexers are selected using the short drive high and short drive low signals.

This provides the option to control the pass transistor 434 with either a short pulse to recharge the capacitor 440 or a continuous pulse to the capacitor 440. For high speed signals low current applications it is likely more appropriate to control the pass transistor 434 with short fixed pulses and prevent the possibility of discharging the capacitor 440 by having both transistor 434 and the host pull down transistor active at the same time. For low speed high current applications this risk is minimized and it may be more appropriate to allow for a longer charge time. Additionally pulse timer 420 is available to program the duration of the recharge pulse in multiples of the clock signal FOSC.

As noted above, in some instances, the supplied voltage from the host 408 may be at a lower than desired operating voltage. In this case, a boost power supply 450 can be used to override the pass transistor 434. The boost power supply 450 can be constructed from inductor 480 and internal boost power supply transistor 482.

This boost supply could be synchronous by using the additional rectifying transistor 484 controlled synchronously by AND gate 488 or this could be asynchronous by using a diode in place of the rectifying transistor, in which case AND gate 488 will not be required. Some implementations may require additional ports 492, 490. In some embodiments, if the power boost is not needed, the ports 490, 402 may be tied together.

In the embodiment illustrated, the circuit further includes AND gate 488 which functions as boost control 111 (FIG. 1B). The circuit receives as a input a BOOST signal from software, based mainly on the voltage on Vdd and capacitor 440. Other parameters might also affect the boost control signal, e.g., the function that is currently being performed by the target system (e.g., EEPROM writes or even normal operations). In FIG. 4, the boosted up Vdd voltage is now on pin 492. A capacitor 494 may be provided to filter noise on the boosted up Vdd supply. Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A combined power and input/output system, comprising:
    a host system operable to drive a high voltage and a low voltage on a combined power and I/O line;
    a target system operably coupled to the host system via the combined power and I/O line; and
    a power boost circuit in the target system coupled with the combined power and I/O line and operable to convert the high voltage supplied on the combined power and I/O line to a voltage higher than the high voltage, wherein the higher voltage is stored on a power supply capacitor, wherein the power boost circuit comprises an inductor and a diode interposed between the host system and the power supply capacitor on the combined power and I/O line; and
    a switching system operable in cooperation with the power boost circuit to charge and discharge the inductor into the power supply capacitor during communication when said combined power and I/O line is at the high voltage.

2. The combined power and input/output system of claim 1, wherein a maximum communication baud rate is synchronized to an on period of the power boost circuit.

3. The combined power and input/output system of claim 1, further comprising a software override of the power boost circuit.

4. The combined power and input/output system of claim 1, wherein during an input phase the power boost circuit is asserted for a predetermined period after a rising edge of a data bit.

5. The combined power and input/output system of claim 1, wherein during an output phase, the power boost circuit is asserted for an entirety of a high portion of a data bit.

6. The combined power and input/output system according to claim 1, further comprising a switch within the target system arranged between the power supply capacitor and the combined power and I/O line.

7. The combined power and input/output system according to claim 6, wherein the switch is controlled by a tri-state driver whose input is connected with the combined power and I/O line, whose output controls the switch and whose tristate control is connected with the power supply capacitor.

8. The combined power and input/output system according to claim 6, wherein the switch is a field effect transistor controlled by a further field effect transistor coupled between a gate of the field effect transistor and ground, wherein a gate of the further field effect transistor is connected with the combined power and I/O line.

9. The target system according to claim 1, further comprising a boost control unit receiving a feedback signal from the power supply capacitor and controlling the switching system, wherein the boost control unit comprises an enable input.

10. A method for providing power and I/O on a single line, comprising:
    driving a combined I/O power line by a host to charge a power supply capacitor of a target system in a first mode;
    alternately connecting and disconnecting a power boost circuit to charge and discharge the power supply capacitor when driving the combined I/O power line during a communication over the combined I/O power line in a second mode, wherein the power supply capacitor is charged to voltage higher than a voltage provided by the host.

11. A method for providing power and I/O on a single line in accordance with claim 10, wherein during data input of the target system, the power boost circuit is asserted so as to charge the power supply capacitor responsive to a rising edge of a data bit transmitted by the host.

12. A method for providing power and I/O on a single line in accordance with claim 10, wherein during data output of the target system, the power boost circuit is asserted for an entire high portion of a data bit.

13. A method for providing power and I/O on a single line in accordance with claim 10, further comprising employing a software control of the power boost circuit to provide power during a high current activity.

14. An electronic device, comprising:
    a host system operable to drive a high voltage and a low voltage on a combined power and I/O line;
    a target system operably coupled to the host system via the combined power I/O line;
    wherein the target system includes a power boost circuit coupled with the combined power and input/output line and receiving a high voltage signal via the combined power I/O line and a switching system wherein the power boost circuit and switching system are configured to allow the host system to charge a power supply capacitor on the target system in a first mode to a voltage higher than the high voltage, and alternately charge and discharge the power supply capacitor during a communication via the combined power I/O line in a second mode, wherein the alternately charging and discharging is in synchronization with said communication.

15. An electronic device in accordance with claim 14, wherein the switching system comprises a tristate device.

16. An electronic device in accordance with claim 14, wherein the switching system comprises a switching transistor.

17. An electronic device in accordance with claim 14, wherein during data input of the second mode, the power boost circuit is asserted so as to charge the power supply capacitor responsive to a rising edge of a data bit.

18. An electronic device in accordance with claim 14, wherein during data output of the second mode, the power boost circuit is asserted for an entire high portion of a data bit.

19. An electronic device in accordance with claim 14, further comprising a software input for the power boost circuit to provide power during a high current activity.

* * * * *